United States Patent [19]

Mardesich et al.

[11] Patent Number: 5,237,447
[45] Date of Patent: Aug. 17, 1993

[54] ALKALI METAL FOR ULTRAVIOLET BAND-PASS FILTER

[75] Inventors: Nick Mardesich, Simi Valley; George A. Fraschetti, Arcadia; Timothy A. McCann, Panorama City; Sherwood D. Mayall, La Crescenta; Donald E. Dunn, Upland; John T. Trauger, Pasadena, all of Calif.

[73] Assignee: The United States of America as represented by the Administrator of the National Aeronautics and Space Administration, Washington, D.C.

[21] Appl. No.: 936,417

[22] Filed: Aug. 27, 1992

[51] Int. Cl.⁵ .............................. G02B 1/10; G02B 5/20
[52] U.S. Cl. .................................... 359/359; 359/360; 359/582; 359/585; 359/892
[58] Field of Search ............... 359/350, 359, 360, 361, 359/580, 582, 585, 589, 590, 885, 890, 891, 892

[56] References Cited

U.S. PATENT DOCUMENTS

| | | | |
|---|---|---|---|
| 3,681,109 | 8/1972 | Lieberman | 117/33.3 |
| 4,045,125 | 8/1977 | Farges | 350/166 |
| 4,129,434 | 12/1978 | Plumat | 65/60 |
| 4,138,262 | 2/1979 | Wacks et al. | 96/87 |
| 4,157,485 | 5/1979 | Wesselink et al. | 313/174 |
| 4,370,025 | 1/1983 | Sato et al. | 359/590 |
| 4,510,190 | 4/1985 | Glaser | 428/34 |
| 4,586,350 | 5/1986 | Berdahl | 359/360 |
| 4,626,071 | 12/1986 | Wada et al. | 359/885 |
| 4,763,966 | 8/1988 | Suzuki et al. | 359/359 |
| 4,764,670 | 8/1988 | Pace et al. | 359/890 |
| 4,965,093 | 10/1990 | Neuman et al. | 427/109 |
| 5,024,923 | 6/1991 | Suzuki et al. | 359/885 |
| 5,080,455 | 1/1992 | King et al. | 359/350 |
| 5,122,428 | 6/1992 | Simons | 359/891 |
| 5,181,141 | 1/1993 | Sato et al. | 359/580 |

Primary Examiner—Martin Lerner
Attorney, Agent, or Firm—Thomas H. Jones; John H. Kusmiss; Guy M. Miller

[57] ABSTRACT

An alkali metal filter having a layer of metallic bismuth deposited onto the alkali metal is provided. The metallic bismuth acts to stabilize the surface of the alkali metal to prevent substantial surface migration from occurring on the alkali metal, which may degrade optical characteristics of the filter. To this end, a layer of metallic bismuth is deposited by vapor deposition over the alkali metal to a depth of approximately 5 to 10 Å. A complete alkali metal filter is described along with a method for fabricating the alkali metal filter.

25 Claims, 2 Drawing Sheets

ALKALI METAL FOR ULTRAVIOLET BAND-PASS FILTER

ORIGIN OF THE INVENTION

The invention described herein was made in the performance of work under a NASA contract, and is subject to the provisions of Public Law 96-517 (35 U.S.C. Section 202) in which the Contractor has elected not to retain title.

TECHNICAL FIELD

The invention generally relates to ultraviolet band-pass filters and, in particular, to alkali metal band-pass filters.

BACKGROUND ART

Alkali metals are employed as a component of ultraviolet band-pass filters. In such filters, a thin film of the alkali metal is used as a filter to achieve optical characteristics necessary for far ultraviolet imaging, particularly for use with silicon CCD sensors. The alkali metals are employed because they achieve a broad far ultraviolet band-pass, yet provide substantial rejection of wavelengths longer than 3000 Å. Further, alkali metal filters achieve high optical surface quality and environmental stability within a compact physical format appropriate for use in a filter wheel. Alkali metal filters are ideally suited for numerous applications requiring far ultraviolet filtering.

A conventional alkali metal filter is formed by depositing a layer of an alkali metal such as sodium onto a substrate window by vapor deposition. To achieve an optimal filter, the alkali metal layer must be physically stable, otherwise optical surface quality may degrade. When initially deposited, the alkali metal typically has a crystalline structure. Unfortunately, the crystalline structure of the alkali metal layer is unstable and surface migration can occur on an outer surface of the alkali metal film. Such surface migration is caused by the high surface free energy. The alkali metal atoms cluster into thick areas and voids, resulting in a general nonuniformity of the alkali metal layer which degrades the optical performance of the filter.

STATEMENT OF THE INVENTION

As can be appreciated, there is a need to provide an alkali metal filter relatively free from surface migration of atoms of the alkali metal layer. Accordingly, it is an object of the invention to provide such an improved alkali metal filter and to provide methods for manufacturing such an improved filter.

These and other objects of the invention may be achieved by depositing a layer of metallic bismuth over the alkali metal layer of an alkali metal ultraviolet band-pass filter. In accordance with a preferred embodiment, the filter includes a first substrate formed of magnesium fluoride ($MgF_2$) having an alkali metal layer of sodium deposited in high vacuum by vapor deposition onto the substrate and having a metallic bismuth layer deposited onto the sodium, also by vapor deposition. The metallic bismuth alloys with the surface of the sodium layer. A second $MgF_2$ substrate is mounted over the bismuth layer to hermetically seal the metallic bismuth and the sodium within the vacuum. The second substrate is mounted to the first substrate by a pair of annular chromium rings separated by a thin annular ring of compressed indium. Preferably, the sodium layer has a depth or thickness of 5000 to 9000 Å, and the metallic bismuth layer has a depth or thickness of 5 to 10 Å.

In accordance with another aspect of the invention, a method is provided for manufacturing the above-described alkali metal filter in a high vacuum environment. The method includes the steps of depositing an alkali metal layer on a first substrate, then depositing a metallic bismuth layer onto the alkali metal layer. The bismuth layer alloys with the surface of the alkali metal layer at room temperature.

Prior to deposition of the metallic bismuth layer, an annular chromium ring may be deposited around a periphery of the first substrate, and a second annular chromium ring may be deposited around a periphery of a second substrate. An indium annular ring is then positioned between the two chromium rings. Next, the substrates are pressed together to compress the indium, thereby deforming the indium and sealing the two substrates together. Depending upon the thickness of the various layers, a gap may remain between the substrates. A post may be positioned within the gap between the two substrates to prevent the substrates from bowing under atmospheric pressure. The chromium rings may be deposited by any suitable method such as sputter deposition. Preferably, the alkali metal and bismuth layers are deposited by vapor deposition.

By providing a metallic bismuth layer over the alkali metal layer of the filter, surface migration in the alkali layer is substantially eliminated. The metallic bismuth effectively acts as a net over the alkali metal to prevent surface atoms of the alkali metal from migrating. As a result, the alkali metal surface layer in contact with the substrate maintains its initial crystalline structure with little or no degradation in the surface quality of the alkali layer.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings.

DETAILED DESCRIPTION OF THE INVENTION

The following description is provided to enable any person skilled in the art to make and use the invention and sets forth the best modes contemplated by the inventors of carrying out their invention. Various modifications, however, will remain readily apparent to those skilled in the art, since the generic principles of the present invention have been defined herein specifically to provide an alkali metal filter having a metallic bismuth layer provided to substantially eliminate surface migration in the alkali metal layer.

Figure 1:
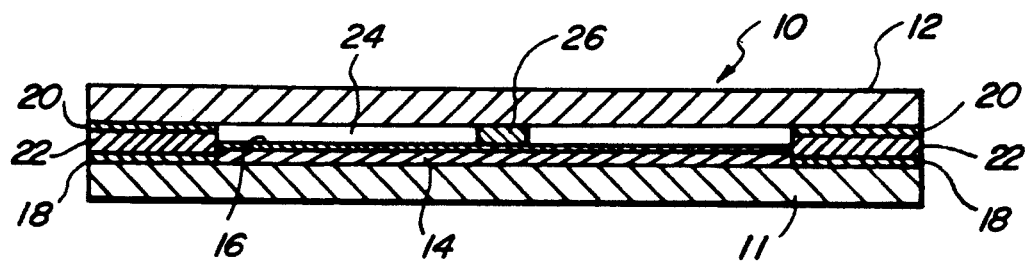
FIG. 1 provides a side cross-sectional view of an alkali metal filter constructed in accordance with the invention.
Figure 2:
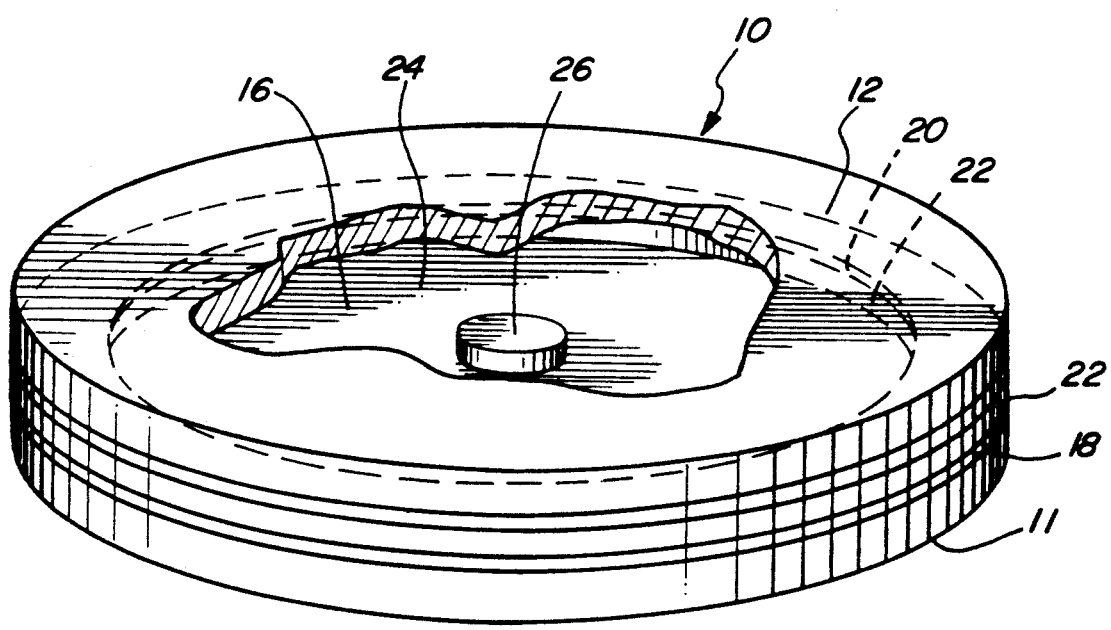
FIG. 2 provides a perspective cutaway view of the filter of FIG. 1.

Referring to FIGS. 1 and 2, an alkali metal filter constructed in accordance with a preferred embodiment of the invention will now be described. Alkali metal filter 10 includes circular $MgF_2$ windows or substrates, 11 and 12. A crystalline film or layer 14 of an alkali metal is deposited, preferably by vapor deposition, onto an upper surface of substrate 11. Sodium is preferably used as the alkali metal. However, other alkali metals or alloys may be employed to achieve differing optical characteristics. The alkali metal covers an inner circular portion of substrate 11.

A layer or film of metallic bismuth 16 is deposited, also preferably by vapor deposition, onto a top surface of alkali metal layer 14. Metallic bismuth 16 covers the entire surface of the alkali metal layer and substantially prevents surface migration from occurring on the alkali metal film. Such surface migration is caused by the high surface free energy, which causes the alkali metal atoms to cluster into thick areas and voids, thus degrading the optical properties of the alkali metal filter. Essentially, metallic bismuth layer alloys with the alkali metal 16 and acts as a net covering the surface of the alkali metal to reduce the mobility of atoms crossing the bismuth net barrier. The net size is small such that large clusters of atoms or voids are prevented from forming, which maintains the initial crystalline structure of the alkali metal in contact with the substrate.

To seal the alkali metal layer 14 and the metallic bismuth layer 16, substrate 12 is securely mounted over a top surface of the metallic bismuth layer. To this end, a pair of annular chromium rings 18 and 20, respectively, are formed around the periphery of the substrates prior to alkali metal deposition. An annular ring of compressed indium 22 is mounted between the pair of chromium rings and seals the chromium rings together, thereby sealing and isolating the metallic bismuth and sodium layers. Other sealing metals besides indium may be employed. Indium is preferred because it is highly malleable and can be cold pressed. That is, the indium can be compressed to form a seal without requiring any substantial increase in temperature of the alkali metal filter.

A gap 24 exists between an upper surface of the metallic bismuth layer and a lower surface of substrate 11 within the annular interior of the chromium and indium rings. Gap 24 is preferably substantially a vacuum. To prevent substrates 11 and 12 from bowing together into a convex shape as a result of air pressure acting upon outer surfaces of the substrates, a supporting post 26 is provided in the center of gap 24. Post 26, which may be composed of copper, abuts the lower surface of substrate 12 and the upper surface of metallic bismuth layer 16.

The representation of the alkali metal filter 10 in the drawing figures is somewhat schematic and does not necessarily set forth the actual relative sizes and thicknesses of the various components. The alkali metal layer preferably has a thickness of 5000 to 9000 521, and the metallic bismuth layer preferably has a thickness of 5 to 10 Å. Each annular chromium ring preferably has a thickness of 2000 Å, and the indium annular ring is preferably, pressed to a thickness of between approximately 0.004 and 0.007 inch. With these preferred dimensions, gap 24 has a thickness of between 0.004 and 0.007 inch. Post 26 has a height selected to equal the width of gap 24.

Additional optical coatings may be provided onto the exposed surfaces of substrates 11 and 12 to further select for desired optical properties.

Although metallic bismuth is preferred for deposition over the alkali layer to prevent surface migration, other related metals may alternatively be employed including, for example, tellurium and antimony. Metallic bismuth is preferred for its ease of deposition and lack of substantial toxicity.

Figure 3:
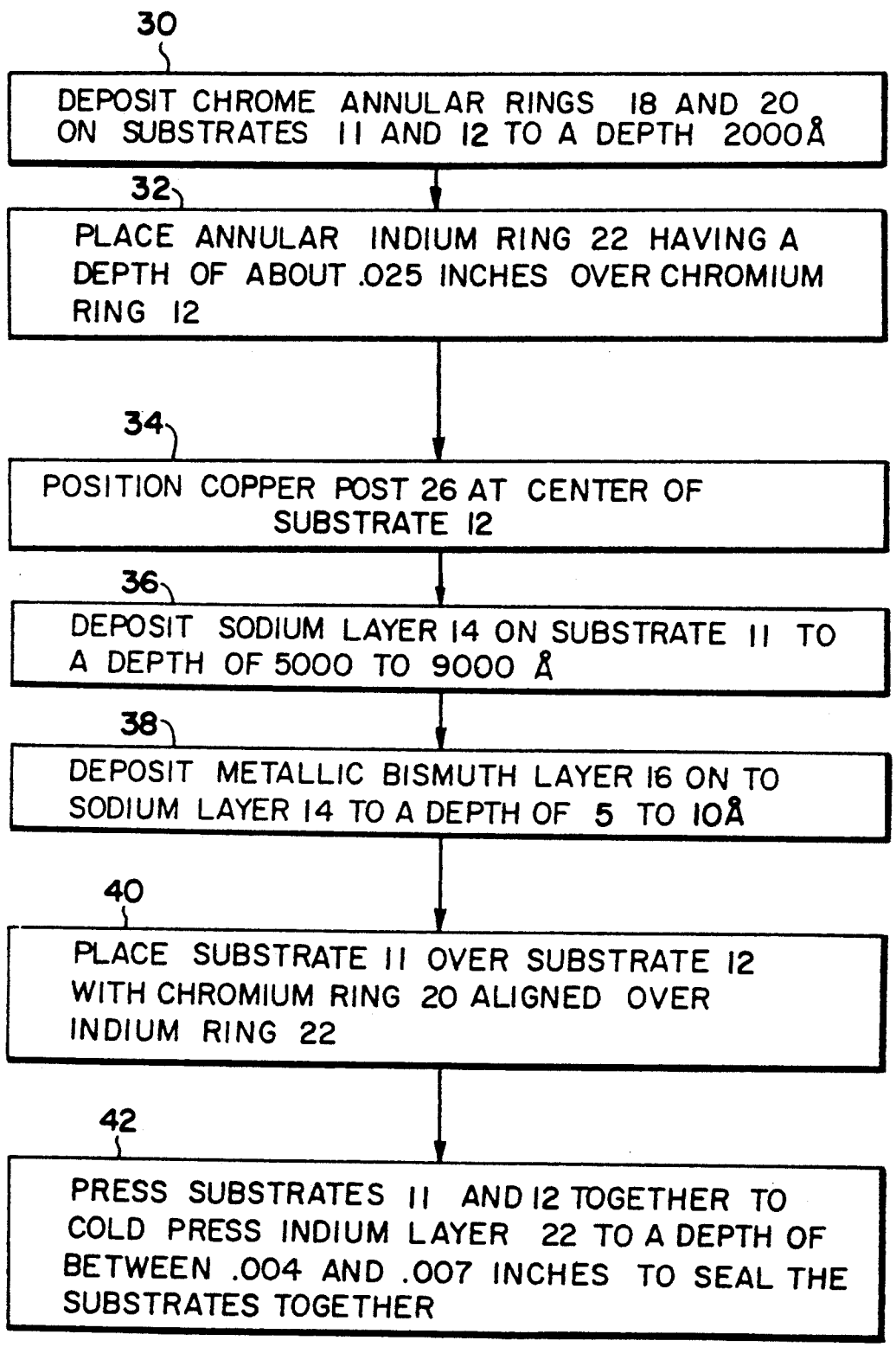
FIG. 3 is a block diagram, somewhat in schematic form, providing steps of a method for manufacturing the alkali metal filter of FIG. 1.

A method for fabricating the alkali metal filter of FIGS. 1 and 2 will now be described with reference to FIG. 3. After carefully cleaning a pair of circular $MgF_2$ substrates 11 and 12, a pair of chromium annular rings 18 and 20 are deposited on an outer periphery of the substrates. Preferably the chromium annular layers are deposited by sputter deposition in a chamber having a pressure of approximately $9 \times 10^{-5}$ Torr. The substrate may be irradiated with an ion beam having a beam current of approximately 35 mA exposed for a period of approximately 60 seconds. After terminating the ion beam, chromium is deposited at a rate of approximately 10 Å per second to a depth of 2000 Å. This step of deposition of the chromium annular rings is represented by reference numeral 30 in FIG. 3.

At step 32, an annular ring of indium 22 having a depth of about 0.025 inch is positioned over chromium ring 18 of substrate 12. At step 34, copper post 26 is positioned at the center of substrate 12. Copper post 26 has an initial height of about 0.01 inch.

Next, at step 36, alkali metal layer 14, preferably comprising sodium, is deposited on the substrate. The sodium is deposited in a conventional vapor deposition chamber at a deposition rate of 250 to 450 Å per second to a depth of between 5000 and 9000 Å. Only that portion of substrate 11 and the interior portion of annular chromium ring 18 is exposed to the sodium deposition.

At step 38, a film or layer of metallic bismuth is deposited onto only the sodium layer. This deposition is likewise achieved in a vapor deposition chamber. Preferably, the metallic bismuth is deposited at a rate of 1 Å per second to a depth of 5 to 10 Å.

At step 40, substrate 11 is positioned over substrate 12 with chromium ring 20 aligned over indium ring 22. Finally, substrates 11 and 12 are pressed together, preferably at a pressure of 800 psi, until the indium layer is compressed to a depth or thickness between 0.004 and 0.007 inch.

During this step copper post 26 is also somewhat compressed.

Preferably, the dimensions of the indium ring are initially selected such that, upon pressing the substrates together, the deformed indium does not spread over any portion of the metallic bismuth surface. To this end, substrates 11 and 12 have preferred diameters of 2 inches, with the initial annular ring of indium having an internal diameter of 1.850 inches and an external diameter of 1.9 inches. After pressing, the internal diameter of the annular indium ring is approximately 1.750 inches. The external diameter will reach at least 2 inches. Any excess indium pressed out from between the substrates may be removed from the outer periphery of the substrates.

Prior to pressing, a total height of metal filter 10 taken perpendicularly through the filter is approximately 0.063 inch. After pressing, the thickness is approximately 0.025 inch.

These dimensions, as well as the various depths and thicknesses of the various layers of the filter, are merely preferred or exemplary dimensions. Alkali filters having various other sizes, dimensions, and thicknesses may be selected in accordance with the invention to achieve particular purposes. As noted above, other alkali metals may be employed. Also, the chromium and indium annular rings may be composed of other appropriate substances, and the substrates need not be composed of MgF$_2$. Although metallic bismuth is preferred for coating the alkali metal layer, other related metals including tellurium and antimony may alternatively be used.

Those skilled in the art will appreciate that various adaptations and modifications of the justdescribed preferred embodiment can be configured without departing from the scope and spirit of the invention. Therefore, it is to be understood that, within the scope of the appended claims, the invention may be practiced other than as specifically described herein.

We claim:

1. An alkali metal band-pass filter comprising:
    a substrate;
    an alkali metal layer formed on the substrate, said alkali metal layer allowing only predetermined frequencies of light to pass therethrough; and
    means for stabilizing a surface of the alkali metal layer to prevent surface migration of atoms of said alkali metal layer along said surface.

2. The alkali metal band-pass filter of claim 1, wherein said means for stabilizing the surface of the alkali metal comprises a layer of a stabilizing metal formed over the surface, said stabilizing metal selected from a group consisting of metallic bismuth, antimony, and tellurium, which alloy with the alkali metal.

3. An alkali metal band-pass filter comprising:
    a first substrate;
    a layer of alkali metal formed on the substrate, said alkali metal layer allowing only predetermined frequencies of light to pass therethrough; and
    a layer of metallic bismuth formed over the alkali metal layer of the substrate and alloyed with the alkali metal layer, said layer of metallic bismuth being sufficiently thin to not substantially affect light passed through said alkali metal layer.

4. The filter of claim 3, wherein the alkali metal is sodium.

5. The filter of claim 3, wherein the substrate is formed of MgF$_2$.

6. The filter of claim 3, further comprising a second substrate mounted over the bismuth layer of the first substrate to seal the bismuth and alkali metal layers.

7. The filter of claim 6, further comprising a peripheral annular ring of indium compressed between an outer periphery of the first substrate and an outer periphery of the second substrate.

8. The filter of claim 7, wherein the indium has a compressed thickness of between 0.004 and 0.007 inch.

9. The filter of claim 7, wherein the indium is compressed between a pair of annular rings of chromium formed on outer peripheries of the first and second substrates.

10. The filter of claim 9, wherein each chromium layer has a thickness of 2000–4000 Å.

11. The filter of claim 3, wherein the alkali metal has a depth of 5000 to 9000 Å.

12. The filter of claim 3, wherein the metallic bismuth layer has a depth of 5 to 10 Å.

13. An alkali metal filter comprising:
    a first circular substrate;
    a first annular ring of chromium formed on an outer periphery of a top surface of said first substrate;
    a crystalline sodium layer formed on the top surface of said first substrate interior to said first annular ring of chromium, said sodium layer allowing only predetermined frequencies of light to pass therethrough;
    a metallic bismuth layer formed on a top surface of said sodium layer and alloyed with the sodium layer, said layer of metallic bismuth being sufficiently thin to not substantially affect light passed through said alkali metal layer;
    a second substrate;
    a second annular ring of chromium formed on an outer periphery of a bottom surface of said second substrate;
    an annular ring of compressed indium sealingly mounted to the first and second chromium rings, said indium ring sealing said sodium and bismuth layers under a gap between the first and second substrates; and
    a post mounted between a top surface of said bismuth layer and the bottom surface of said second substrate, near a center of said substrates, said posts preventing inward bowing at said substrates.

14. A method for forming an alkali metal band-pass filter comprising the steps of:
    depositing a layer of alkali metal onto a first substrate, said alkali metal layer allowing only predetermined frequencies of light to pass therethrough; and
    depositing a layer of metallic bismuth over the alkali metal layer of the first substrate, said metallic bismuth alloying with the alkali metal layer, said layer of metallic bismuth being sufficiently thin to not substantially affect light passed through said alkali metal layer, such that the metallic bismuth alloys with the alkali metal to surface stabilize the alkali metal.

15. The method of claim 14, further comprising the step of sealing the bismuth and alkali metal layers under a second substrate.

16. The method of claim 15, wherein the step of sealing the bismuth and alkali metal layers comprises the steps of:
    mounting an annular ring of indium onto an outer periphery of the first substrate; and
    pressing the second substrate onto the indium ring of the first substrate to seal the bismuth layer of the first substrate, the indium ring forming a peripheral seal.

17. The method of claim 16, wherein said step of mounting the annular ring of indium, further comprises the steps of:
    depositing an annular ring of chromium onto the outer periphery of the first substrate prior to mounting the indium ring to the first substrate, the indium ring being positioned over the chromium ring; and
    depositing a chromium ring around a periphery of the second substrate, and aligning the chromium ring of the second substrate with the indium ring of the first substrate prior to pressing the second substrate onto the indium ring.

18. The method of claim 16, wherein the indium ring as a prepressed thickness of approximately 0.025 inch and a postpressed thickness of between 0.004 and 0.007 inch.

19. The method of claim 16, wherein the step of pressing the second substrate onto the indium ring is performed to a pressure of approximately 800 psi for approximately one minute.

20. The method of claim 14, wherein the alkali metal is sodium.

21. The method of claim 14, wherein the substrate is formed of $MgF_2$.

22. The method of claim 14, wherein the step of depositing the alkali metal and the step of depositing the metallic bismuth are performed by vapor deposition.

23. The method of claim 14, wherein the alkali metal is deposited to a depth of 5000 to 9000 Å.

24. The method of claim 14, wherein the metallic bismuth layer is deposited to a depth of 5 to 10 Å.

25. An alkali metal band-pass filter formed by the steps of:
depositing a crystalline layer of alkali metal onto a substrate, said alkali metal layer allowing only predetermined frequencies of light to pass therethrough; and
depositing a layer of metallic bismuth over the alkali metal layer of the substrate, said metallic bismuth alloying with the alkali metal layer, said layer of metallic bismuth being sufficiently thin to not substantially affect light passed through said alkali metal layer.

* * * * *